United States Patent [19]
Lieberman

[11] 3,730,327
[45] May 1, 1973

[54] MERCHANDISING AID

[75] Inventor: Edgar M. Lieberman, Kansas City, Mo.

[73] Assignee: Mar-Con, Inc., North Kansas City, Mo.

[22] Filed: Sept. 30, 1971

[21] Appl. No.: 185,153

[52] U.S. Cl..................................198/37, 221/13
[51] Int. Cl...............................................B65g 43/08
[58] Field of Search.....................198/37, 232, 111; 104/155; 186/1 B; 193/25 B, 35 A, 32; 188/269, 271; 294/87 R; 193/35 A

[56] References Cited

UNITED STATES PATENTS

| | | | |
|---|---|---|---|
| 3,251,458 | 5/1966 | Niekamp et al. | 198/37 |
| 3,108,671 | 10/1963 | Fuka et al. | 193/35 A |
| 1,283,539 | 11/1918 | McQueen | 198/232 |

Primary Examiner—Richard E. Aegerter
Assistant Examiner—Joseph E. Valenza
Attorney—Fishburn et al.

[57] ABSTRACT

A merchandising aid for use on or as a shelf for storing and displaying articles of merchandise and moving same forward to an advanced position as the articles are removed therefrom including a support with an article conveyor thereon having an upper run for support of articles. A power means is operatively connected to the conveyor for moving same and articles to advance same toward the customer position. A retarder means is connected relative to the conveyor and operatable to limit the rate of travel thereof and an abutment member is engaged by an article when in advanced position to operate a brake means to stop the movement of the conveyor.

14 Claims, 10 Drawing Figures

INVENTOR.
Edgar M. Lieberman
BY
Fishburn, Gold & Litman
ATTORNEYS

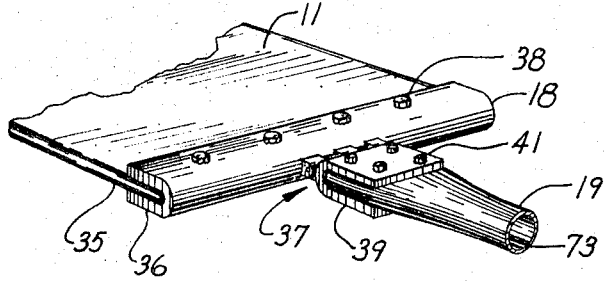
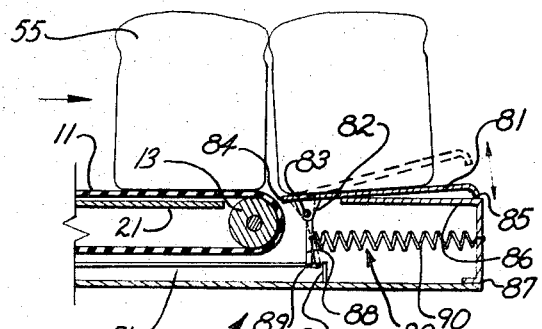
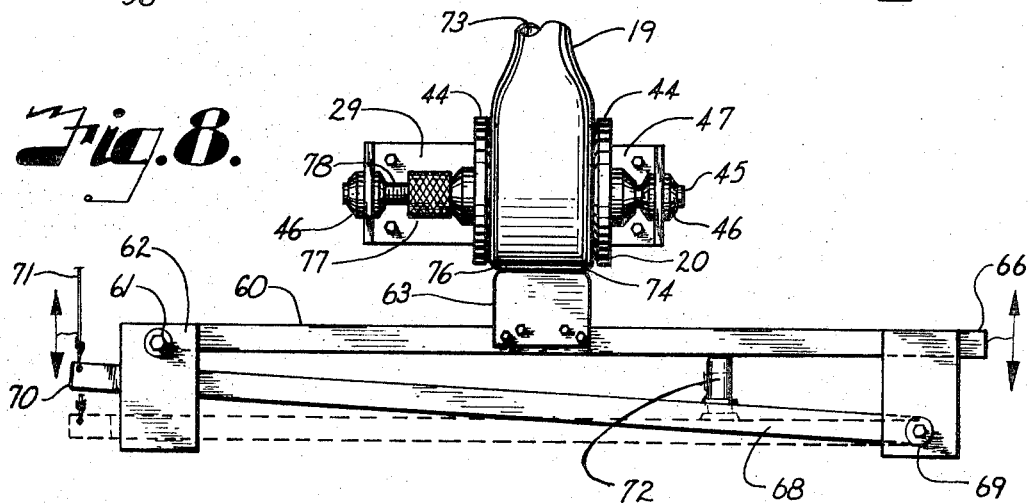
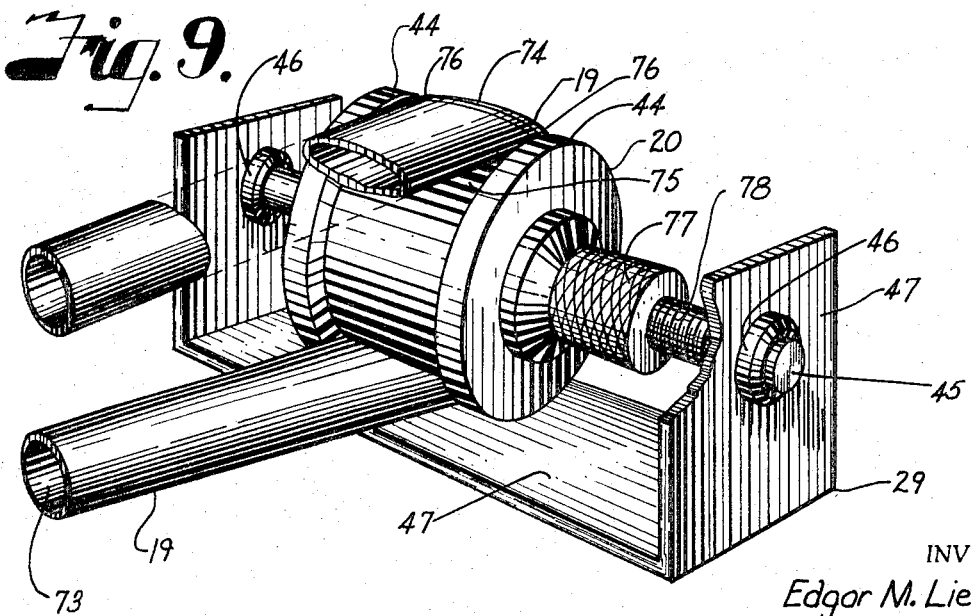
INVENTOR.
Edgar M. Lieberman

MERCHANDISING AID

This invention relates to article storing and vending apparatus and more particularly to such structure wherein articles are advanced by conveyor means to a prominent position as articles are removed therefrom.

In vending merchandise in stores and the like a quantity of the like articles are positioned on shelves which may be at walls, on island displays or racks. The articles are usually arranged to extend from the front of the shelf to the rear or back thereof and the customer usually will remove the articles in the most advanced position leaving a space from the foremost article remaining to the front of the shelf. It is recognized that articles at the front of the shelf are in a more prominent position than those wherein the quantity has receded and this may result in sales of the more prominent article rather than from an adjacent group of articles in which the foremost is spaced away from the front of the shelf. Therefore, it is desirable to not only store articles on the shelf but also move same forward to keep the articles advanced to a prominent position relative to other articles along the shelf.

The principal objects of the present invention are to provide a merchandising aid in the form of article storing and advancing apparatus to automatically advance articles to a foremost position as articles are removed therefrom; to provide such an apparatus with a conveyor structure having power means to drive same to advance the articles, and having a stop apparatus operative to stop the conveyor when an article is in the advanced position; to provide such an apparatus with a speed retarder to regulate the speed of the conveyor in advancing of articles; to provide such a structure wherein the conveyor has upper and lower runs with a coverplate; to provide such a structure wherein said coverplate may have indicia thereon to serve as a shelf talker for advertising; to provide a speed retarder in the form of a liquid filled elongate tube with closed ends with a constricted portion restricting flow of fluid thereby, the movement of the table being in accordance with such restricted flow, to provide such an apparatus with such a flow retarder operatively connected to the conveyor for governing the rate of movement of the conveyor; and to provide a merchandising aid to automatically advance articles in a vending display that is economical to manufacture, long wearing and efficient in operation.

Other objects and advantages of this invention will become apparent from the following description taken in connection with the accompanying drawings wherein are set forth by way of illustration and example certain embodiments of this invention.

BRIEF DESCRIPTION OF THE DRAWINGS

FIG. 7 is enlarged detail perspective view of the connection at ends of a conveyor strip and the flow retarder tube.

FIG. 8 is a detail plan view of the retarder tube mounting pulley and the brake apparatus.

FIG. 9 is an enlarged fragmentary perspective view of the retarder tube and pulley mounting.

FIG. 10 is a partial sectional view through a modified form of control in which the conveyor is stopped by weight of an article.

DESCRIPTION OF THE PREFERRED EMBODIMENTS

Figure 1:
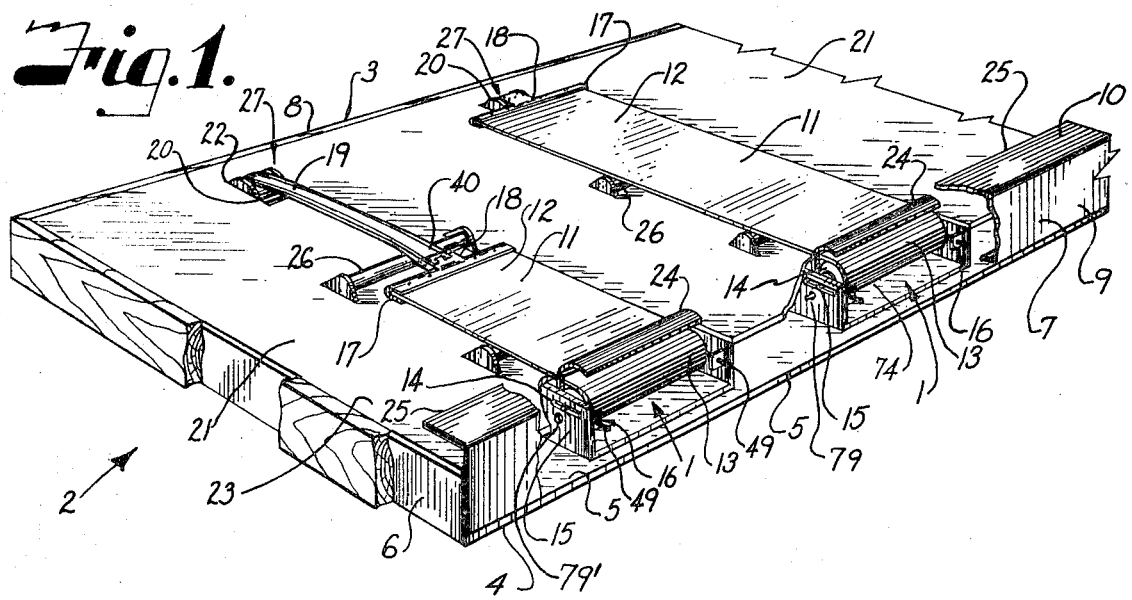
FIG. 1 is a perspective view of a shelf having article advancing apparatus embodying the present invention with portions of the shelf broken away to show some of the structure therein.
Figure 2:
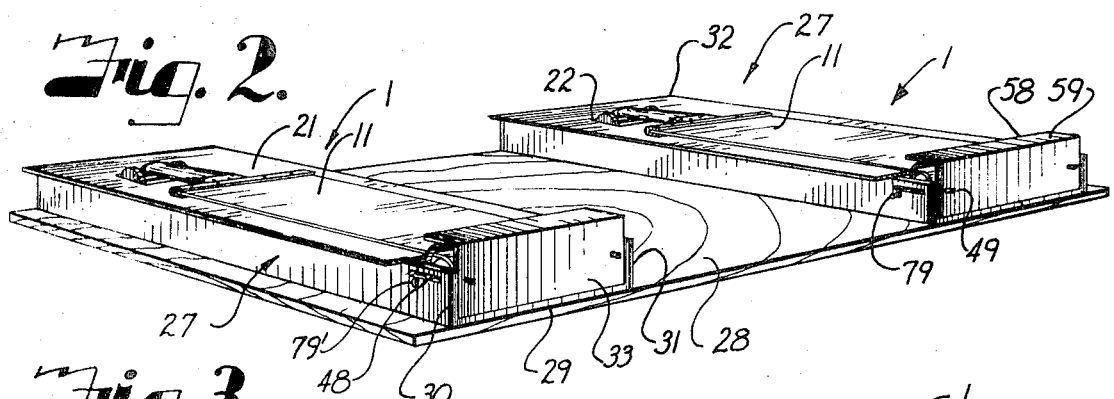
FIG. 2 is a perspective view of article advancing units mounted on an article display shelf.
Figure 3:
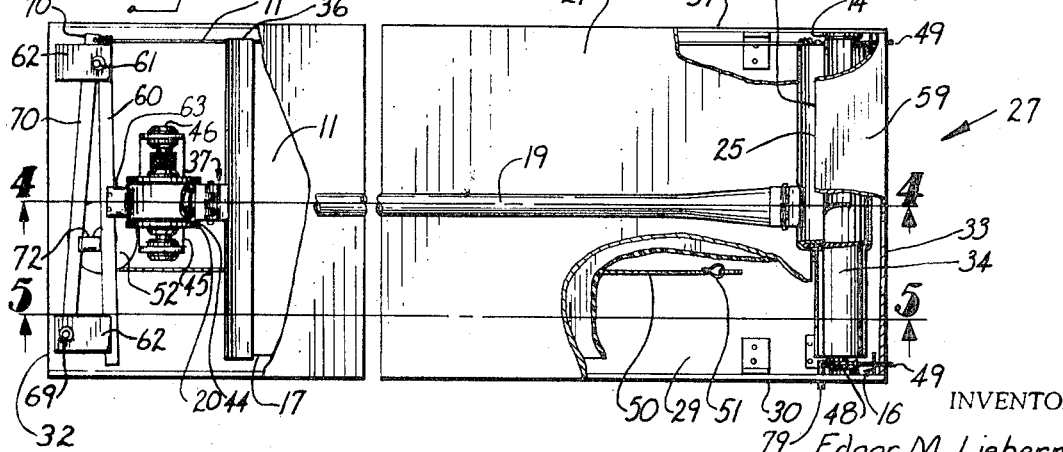
FIG. 3 is a plan view of an article advancing apparatus with portions broken away to show the structure therein.
Figure 4:
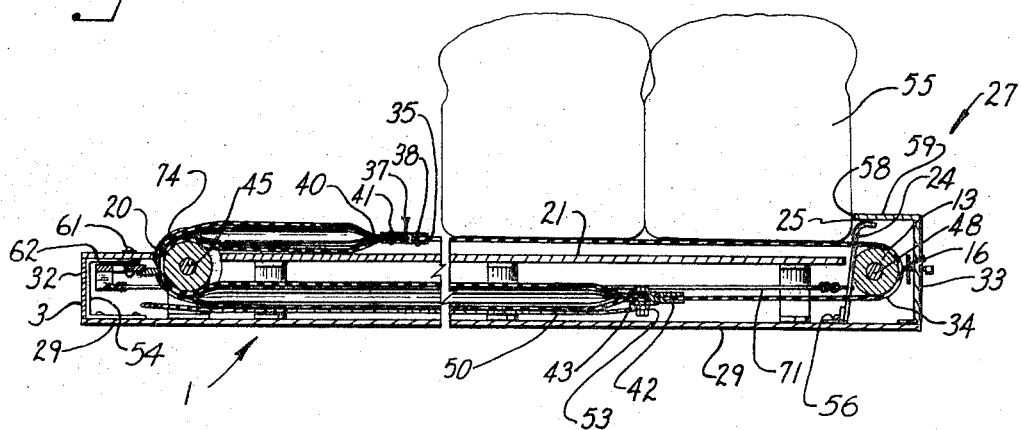
FIG. 4 is a longitudinal sectional view through the article advancing unit taken on the line 4—4, FIG. 3.

Referring in detail to the drawings, the reference numeral 1 generally designates an article advancing apparatus adapted to be used as individual units on or in shelves or to be used in a shelf structure 2. In the structure illustrated in FIG. 1, the shelf 2 may have any suitable mounting not shown, such as in a tier along a wall, in an island display, or as a shelf in a rack. The shelf has a rear edge 3 and a front edge 4, the front edge being adjacent to the position of a customer viewing the merchandise as from an aisle or the like. In the structure illustrated in FIG. 1, the shelf has a bottom member 5 which may be of any suitable rigid material such as metal, wood or the like with end members 6 provided with a decorative strip 7, a rear wall 8 and an upstanding front wall 9 having a rearward turned flange 10 suitably spaced upward from the bottom member, as described. In the structure illustrated in FIG. 1 there are a plurality of article advancing mechanisms 1 spaced along the shelf 2 with each having a conveyor member 11 which may be of any suitable material providing an upper run 12 to support articles of merchandise thereon. In the structure illustrated, the conveyor member is a flexible strip of plastic or the like which extends over a roller 13 suitably mounted in bearing structures 14 carried in mounting brackets 15 supported on the bottom 5. It is preferred that the bearing members 14 be adjustable longitudinally of the conveyor by suitable adjusting mechanism 16 to provide proper tightness of the conveyor strip. An end 17 of the conveyor strip is secured as at 18 to an elongate member 19 that operates over a pulley 20 and has its other end connected to the other end of the conveyor strip whereby the conveyor strip and member 19 form a continuous member with upper and lower runs is a cover or top plate 21 for the shelf, said top plate having apertures or notches 22 to fit around the pulley 20 and roller 13. It is preferred that the top plate 21 be of plastic and that it be adapted to support articles of merchandise and also have advertising material or information as at 23 serving as a shelf talker to promote the articles of merchandise.

The roller 13 is generally under the flange 10 of the front wall 9 and an abutment member 24 is arranged adjacent roller 13 and slightly rearward of the edge 25 of the flange 10 whereby the abutment 24 is engaged by a article when the article is substantially in the advanced position. The article operates the abutment which is suitably connected to a brake to stop operation of the conveyor as later described. For heavy articles, suitable rollers 26 are mounted on the coverplate 21 to provide a rolling engagement with the under side of the conveyor strip 11 to facilitate movement thereof. The mounting and control of the article advancing apparatus in the shelf 2 are substantially the same as those of the article advancing units 27, the structure of which is illustrated in FIGS. 2 to 9 inclusive. Therefore, to simplify the description the remaining description herein will apply as to the details of the advancing apparatus shown in FIG. 1 except for specific structure described in the above relative thereto.

The article merchandising units illustrated in FIG. 2 to 9 inclusive are in individual units which may be located as desired on the top of a shelf 28 or they may be recessed into a shelf or otherwise utilized as each are individual and separate in advancing articles of merchandise thereon. In the structure illustrated, each unit has a bottom 29 with upturned spaced opposed side walls 30 and 31, a rear end wall 32 and a front wall 33 with all of the walls secured together to form a tray-like structure. The conveyor strip 11 operates over a roller 13 positioned adjacent the wall 33, said conveyor strip has one end 35 positioned between flanges 36 of a connector member 37 and suitably secured thereto by a plurality of fastening devices such as rivets or bolts 38. The connecting member also has opposed flanges 39 between which is positioned the end 40 of elongate member 19 which is suitably secured by fastening devices such as rivets or bolts 41. The same form of connector connects the lower or other end 42 of the conveyor strip to the other or lower end 43 of the elongate member 19 providing a combined continuous member which extends over the roller 13 and pulley 20.

The pulley 20 preferably has spaced angular flanges 44 and said pulley is carried on a shaft 45 rotatably mounted in bearings 46 located in upstanding portions of a bracket 47 suitably secured to the bottom member 29 of the unit. It is preferred that the bracket 47 be in fixed position and that tension be adjusted on the continuous conveyor structure by having the roller 13 rotably mounted on a shaft 48 which is adjustably supported by the side walls 30 and 31 for movement in response to adjusting screws 49 to apply a proper tension on the conveyor strip and member 19. The mounting of the ends of the shaft 48 and the adjustment thereof by the screws 49 may be any conventional arrangement.

Force may be applied to the conveyor strip in any suitable manner to urge advancing movement thereof wherein the end 35 moves toward the front wall 33. In the structure illustrated, the power means is an elongate resilient member 50 having one end suitably secured as at 51 to a fixed portion such as a wall of the unit as for example the bottom wall 29. The resilient member 50 extends around a pulley 52 and has a connection as at 53 with the lower connector 37 adjacent to the lower end 42 of the conveyor strip. The pulley 52 is preferably mounted on a suitable bracket 54 rearwardly of the pulley 20 whereby the run of the resilient member 50 connected to the lower connector 37 is substantially in line with a vertical plane extending through the center of the elongate member 19, whereby the pull on the conveyor strip is centrally longitudinally of the lower run of the conveyor. This applies the force that pulls the conveyor and causes the upper run to move toward the forward wall 33.

Figure 5:
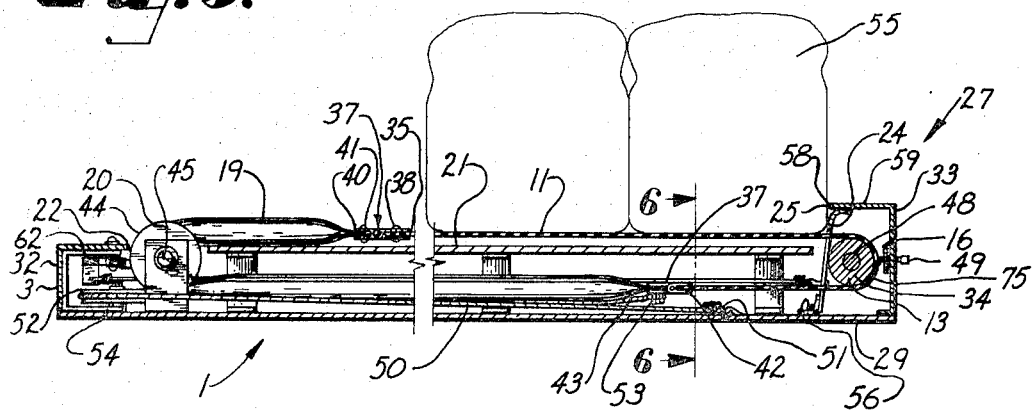
FIG. 5 is a longitudinal section view through the article advancing unit taken on the line 5—5, FIG. 4.
Figure 6:
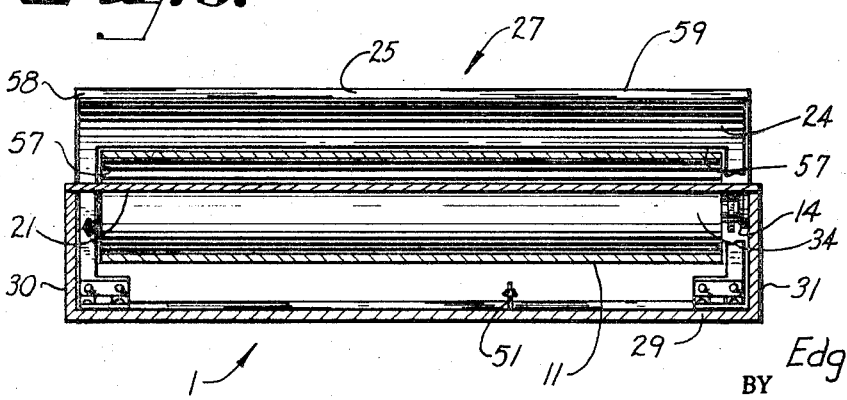
FIG. 6 is an enlarged transverse sectional view of the article advancing unit taken on the line 6—6, FIG. 5.

Articles of merchandise 55 and positioned on said upper run, and the conveyor movement is stopped when an article reaches the desired advanced position as by the application of a suitable brake or the like. In the structure illustrated, an abutment member 24 is in position to be engaged by the article, and in the structure illustrated, said abutment member is an upstanding lever member having a lower end hingedly mounted as at 56 on the bottom 29 and extending upwardly therefrom. The abutment member 24 has openings 57 through which the conveyor strip 11 and roller 34 extend. The top portion of the abutment member extends transversely for greater than the width of the conveyor strip and is above the upper run thereof to be engaged by the article 55. The abutment member 24 normally has its upper portion positioned rearwardly from the rear edge 58 of a rearwardly extending flange 59 on the front wall 33 and swings under said flange when engaged by the article 55 as illustrated in FIG. 5, such swinging movement being sufficient to apply the brake, as later described. A brake may be applied to any portion of the conveyor structure or a mounting and in the illustrated structure a brake arm 60 is pivotally mounted as at 61 on a bracket 62 and extends transversely of the unit, said brake arm being provided with a brake shoe 63 that engages the elongate member 19 as it passes over the pulley 20. The arm 60 may be connected directly by a linkage to the abutment member 24, however, in the illustrated structure said arm 60 has a free end 66 movable in guide 67, and a second brake arm 68 is pivotally mounted as at 69 and has a free end 70 connected by a link 71 to the abutment member 24 so that forward movement of the abutment member moves the second brake arm 68 forwardly and a lug or cam member 72 on the second brake arm 68 engages the brake arm 60 to force same forward to apply the shoe 63 to the member 19 for stopping conveyor movement.

The movement of the conveyor is governed whereby when an article 55 is removed from the advanced position, the conveyor will move forwardly to advance other articles thereon at a suitable rate so as not to damage an article or cause an article to be thrown from the front of the shelf or support. In the structure illustrated, the elongate member 19 is a flexible tube having a continuous bore or a passage 73. The ends of the tube at the connectors are closed with the tube filled with fluid such as liquid or gas. The tube forms a speed retarder as its ends are connected relative to the conveyor strip whereby the tube moves longitudinally in accordance with the movement of the conveyor. The tube is squeezed or flattened intermediate its ends to substantially close the passage 73 in a transverse line, and then in response to force applied to the tube, it can move relative to the member flattening the same at a rate determined by the flow of fluid past the flattened portion. This provides a positive speed control for the conveyor. The tube could be arranged to move past a fixed squeezing structure and could be separate from the conveyor strip as long as its ends were connected relative thereto, however, in the illustrated structure the tube extends over the pulley 20 and the tension on the conveyor strip and tube flatten the tube as at 74 where it extends around the arcuate surface 75 of the pulley. The combination of the force of the power means and the tension on the tube that provides the flattening of the tube results in a slight opening in the constricted passage which permits some flow of fluid and that flow of fluid from one end portion of the tube past the portion to the other end portion determines the rate of movement of the conveyor strip in its advancing operation. Changing of the tension on the tube 19 as by operating the adjusting screws 49 will alter the constricture of said tube and thereby the rate of movement of the conveyor strip.

The brake shoe 63 preferably bears on the tube at the flattened portion 74 at a level slightly below the axis of the pulley. This facilitates the release action as it provides further for squeezing the tube thereby shutting off all flow by the flattened portion as well as providing a friction that tends to stop the movement of the conveyor. It is preferred that the flanges 44 of the pulley 20 be such that their spacing can be adjusted to properly confine the sides 76 of the flattened tube portion. One of the flange members is movable on the shaft 45 and is held in adjusted position by a lock nut 77 threaded on a threaded portion 78 of the shaft 45. To facilitate loading articles on a conveyor a suitable holder is arranged to hold the strip 11 in retracted or loading position until filled. While any suitable holder could be used, the structure illustrated has a pin 79 engageable in a hole 79 in the side wall 30 adjacent and rearward of the brake actuator 24 when in brake applying position. The strip 11 is retracted the brake actuator moved to apply the brake and the pin 79 inserted in the hole 79 and extended to engage the brake actuator to hold the brake actuator 24 in braking position to hold the strip stationary. When the conveyor is loaded the pin 79 is removed or disconnected and the conveyor is ready to advance.

The article advancing unit may be placed individually on a shelf or used as a plurality of spaced apart units or they may be incorporated by recessing into a shelf or made a part of the shelf structure. In each instance, the operation is substantially the same. When in position the upper connector 37 is grasped or pushed to move the upper run of the conveyor rearward until the end is close to the pulley 20. Articles of merchandise 55 are then placed on the upper run to fully load same whereby the foremost is engaged with the abutment member 24 applying the brake shoe 63 to hold the conveyor stationary. When a customer removes the foremost article, the abutment member 24 swings rearward releasing the brake shoe 63 from engagement with member 19. Then the force of the power means 50 applied to the end of the lower run on the conveyor strip 11 moves same rearward causing some flow of fluid past the flattened portion 74 around the pulley 20 to the end portion of the tube in the upper run of the conveyor. This causes the conveyor strip 11 to move forward at a desired rate until the foremost article engages the abutment member 24 swinging same forward to apply the brake stopping further movement of the conveyor until another article is removed therefrom.

In the form of the invention illustrated in FIG. 10 the structure of the article advancing unit is the same as that of the unit 27 as shown in FIGS. 2 to 9 inclusive, except for the control of the brake to stop advancing movement of the conveyor and in the drawing FIG. 10 the parts illustrated are given the same reference numerals where appropriate. In modified form of the structure the articles 55 when advanced by the conveyor strip 11 cause the leading article to move on to a weight responsive member 80 which is operatively connected to the link 71 and thereby to the brake arms to apply the brake shoe 63 to the tube 19 to stop advancing movement of the conveyor. In the structure the illustrated weight responsive structure 80 includes a platform 81 having bearing portions 82 pivotedly mounted on bearing pins 83 being suitably supported in the unit as by the side walls 30 and 31 whereby the rear portion 84 of the platform is adjacent the roller 13 and the strip 11 operating thereover to receive articles 55 from the conveyor strip. The forward portion 85 of the platform 81 preferably extends over a flange 86 on the forward wall 87 of the unit 27 with the flange 86 positioned whereby it serves as a stop and the forward portion 85 of the platform will rest thereon when swung downwardly by the weight of an article 55 thereon. The platform member 81 has an arm 88 fixed relative thereto and extending downwardly with the lower end connected at 89 to the link 71. A spring 90 is suitably connected to the platform and a wall of the unit as for example the forward wall 87 to swing the forward portion 85 of the platform 81 upwardly when the article is removed therefrom. A stop member 91 is suitably positioned to be engaged by a portion of the platform, and as illustrated, the arm 88 to limit the upwardly swinging movement of the platform. The spring 90 is such that it will resist downward movement of the platform by an article thereon until said article is moved sufficiently forward to the front as viewed by purchaser whereby the weight will overcome the spring and swing the platform to operate the brake and stop the advancing movement of the conveyor. With this structure when an article 55 in the foremost or advanced position is removed from the platform 81 said platform will swing upwardly under the influence of the spring 90 releasing the brake and permitting advancing movement of the conveyor to advance the next article until it move up onto the platform member 81 sufficiently whereby the weight thereof will overcome the spring and swing the platform downwardly to again apply the brake, the conveyor remaining stationary until the foremost article is removed.

It is to be understood that while I have illustrated and described certain forms of my invention, it is not to be limited to the specific form and arrangement of parts herein described and shown.

What I claim and desire to secure by Letters Patent is:

1. A merchandising aid for moving articles forward to an advance position as articles are removed therefrom comprising:
   a. a support;
   b. an article conveyor means adapted to support a row of articles thereon;
   c. means on the support mounting said conveyor means for movement of said article conveyor in sequence to an advanced position;
   d. flexible resilient power means operatively connected to said conveyor means for moving same toward said advanced position;

e. retarder means operatively connected to said conveyor means for limiting the rate of advancing movement thereof;

f. means actuated by an article in said advanced position and operative to stop advancing movement of said conveyor means.

2. A merchandising aid as set forth in claim 1 wherein the means actuated by the article to stop advancing movement of the conveyor means includes:

a. an abutment member movably mounted on the support and having a portion extending into the path of the advancing movement of the articles to be engaged by the leading article as it nears the advanced position;

b. a friction brake;

c. means operatively connecting the abutment member with the friction brake to actuate the brake when moved by an advancing article to its advanced position.

3. A merchandising aid for moving articles forward to an advanced position as articles are removed therefrom comprising:

a. a support;

b. an article conveyor means adapted to support a row of articles thereon;

c. means on the support mounting said conveyor means, for movement of articles in sequence to an advanced position;

d. power means operatively connected to said conveyor means for moving same toward said advanced position;

e. retarder means operatively connected to said conveyor means for limiting the rate of advancing movement thereof, said retarder means including;

1. an arcuate surface carried by the support;

2. an elongate flexible tube having closed ends and being filled with fluid, said tube having a reverse bend engaging said arcuate surface, said tube being under tension whereby the portion engaging the arcuate surface is flattened transversely substantially constricting the tube at the reverse bend and thereby restricting flow of fluid from one end portion of the tube through the flattened portion to the other end portion;

3. means connecting the closed ends of the tube relative to said conveyor means whereby advancing movement of the conveyor is permitted in response to movement of the tube over said arcuate surface which movement is in response to the power means acting on the conveyor means and the tension on the tube whereby a limited quantity of fluid passes through the flattened portion of the tube permitting a corresponding movement of the tube and conveyor;

f. means actuated by an article in said advanced position and operative to stop advancing movement of said conveyor means.

4. A merchandising aid as set forth in claim 3 wherein:

a. said arcuate surface is on a pulley rotatably mounted on the support;

b. a roller member is mounted on the support near the advanced position of articles, said roller and pulley being on parallel axes;

c. the conveyor means is a flexible strip having an intermediate portion engaged with said roller and first and second ends extending toward the pulley;

d. the connection of the tube ends relative to the conveyor means being a connection of a leading closed end of the tube to a trailing end of the conveyor means and a connection of the trailing end of the tube to a leading end of the conveyor means.

5. A merchandising aid as set forth in claim 4 wherein:

a. said power means is an elongate resilient member having one end fixed relative to the support and the other end operatively connected to the leading end of the conveyor means.

6. A merchandising aid as set forth in claim 5 wherein:

a. said conveyor means and said tube are combined to form a continuous belt-like structure wherein the leading end of the conveyor is in the lower run and when in fully loaded position the trailing end of the conveyor means is near the pulley in the upper run and the row of articles rest on said upper run of the conveyor means;

b. a support member is mounted on the support between the conveyor runs laterally outwardly to form a cover for the lower run, power means and the support thereunder.

7. A merchandising aid as set forth in claim 3 and including:

a. means operatively connected relatively to said conveyor means to adjust the tension on the flexible tube and the constriction thereof to adjust the rate of advancing movement of the conveyor means.

8. A merchandising aid as set forth in claim 7 wherein the means actuated by an article in said advanced position includes:

a. a platform in the path of articles moved to said advanced position and adapted to receive such articles thereon, said platform being moved in response to weight of an article thereon;

b. means operative in response to said movement of the platform for braking the conveyor means and stop same.

9. In an article conveyor a speed governor comprising:

a. an elongate flexible conveyor member having first and second ends;

b. an elongate tube having first and second closed ends and filled with fluid with said first closed end connected to said first end of said conveyor member and said second closed end connected relative to said second end of said conveyor member;

c. an arcuate surface, said tube having a substantially reverse bend engaging a portion of said arcuate surface, said tube being partially flattened in a line transverse of said tube at said reverse bend;

d. power means operatively connected to said conveyor member urging advancing movement thereof;

e. means acting on the other end of said tube and cooperating with said power means to apply a force on the tube portion engaging said arcuate surface to substantially flatten same and restrict the flow of fluid through said tube portion, said tube moving over said arcuate surface and said conveyor member advancing at a rate governed by the flow of fluid through said flattened tube portion toward said one end of said tube.

10. In an article conveyor as set forth in claim 9 wherein:
a. said arcuate surface is a pulley;
b. brake means having a portion engageable with said tube at the reverse bend thereof and operable to apply force on the tube wall to squeeze same between the brake member and the pulley to stop flow of fluid therethrough.

11. A merchandising aid comprising:
a. a shelf for supporting merchandise for display and sale;
b. a movable strip extending transversely of the shelf and supporting a series of merchandise items thereon for advance of said items from the back to the front relative the shelf;
c. power means connected to said strip for continually urging advancing movement thereof;
d. an abutment means engageable by a forward item on the strip when in fully advanced position;
e. brake means operable in response to the abutment means being free of merchandise engagement to release the strip for movement and operable in response to the abutment means being engaged by an advanced item of merchandise to prevent movement of the strip;
f. a retarder means connected to the strip and limiting the rate of advancing movement of the strip.

12. A merchandising aid as set forth in claim 11 wherein said means actuated by the article in said advanced position includes:
a. means acting on said tube to stop flow of fluid through the constricted portion, said stoppage of flow locking the conveyor means against movement.

13. A merchandise aid for moving articles forward to an advanced position as articles are removed therefrom comprising:
a. a support;
b. an article conveyor means adapted to support a row of articles thereon;
means on the support mounting said conveyor means, for movement of articles in sequence to an advanced position;
d. power means operatively connected to said conveyor means for moving same toward said advanced position;
e. retarder means operatively connected to said conveyor means for limiting the rate of advancing movement thereof, said retarder means including:
1. an elongate flexible tube having closed ends and being filled with fluid, said ends being connected relative to the conveyor means whereby the tube moves with said conveyor means;
2. means engaging the tube intermediate said ends and substantially constricting same restricting flow of fluid from one end portion to the other end portion which flow governs the speed of the conveyor;
f. means actuated by an article in said advanced position and operative to stop advancing movement of said conveyor means.

14. A merchandising aid for moving articles forward to an advanced position as articles are removed therefrom comprising:
a. a support;
b. an article conveyor means adapted to support a row of articles thereon;
c. means on the support mounting said conveyor means, for movement of articles in sequence to an advanced position;
d. power means operatively connected to said conveyor means for moving same toward said advanced position;
e. retarder means operatively connected to said conveyor means for limiting the rate of advancing movement thereof;
f. means actuated by an article in said advanced position and operative to stop advancing movement of said conveyor means, and including:
1. an abutment member movably mounted on the support and having a portion extending into the path of the advancing movement of the articles to be engaged by the leading article as it nears the advanced position;
2. a friction brake;
3. means operatively connecting the abutment member with the friction brake to actuate the brake when moved by an advancing article to its advanced position;
g. said abutment member is a lever pivotedly mounted on the support and normally disposed toward advancing articles and having a portion extending above the conveyor means for engagement by such articles;
h. said friction brake is a lever means mounted on the support having a brake shoe engageable with the flattened portion of the tube in response to movement of the abutment member by an article to prevent passage of fluid past the flattened portion of the tube.

* * * * *